US011909140B2

(12) United States Patent
Barnea et al.

(10) Patent No.: US 11,909,140 B2
(45) **Date of Patent: *Feb. 20, 2024**

(54) HIGH-DENSITY CONNECTOR

(71) Applicant: BIOSENSE WEBSTER (ISRAEL) LTD., Yokneam (IL)

(72) Inventors: Nadav Barnea, Haifa (IL); Alek Vilensky, Netanya (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/089,305

(22) Filed: Dec. 27, 2022

(65) Prior Publication Data

US 2023/0127510 A1 Apr. 27, 2023

Related U.S. Application Data

(63) Continuation of application No. 17/112,773, filed on Dec. 4, 2020, now Pat. No. 11,557,848.

(51) Int. Cl.

*H01R 13/436* (2006.01)
*H01R 13/04* (2006.01)
*H01R 13/514* (2006.01)

(52) U.S. Cl.

CPC ......... *H01R 13/4364* (2013.01); *H01R 13/04* (2013.01); *H01R 13/514* (2013.01)

(58) Field of Classification Search

CPC ................ H01R 13/631; H01R 13/629; H01R 13/4364; H01R 13/04; H01R 13/504; H01R 13/514

USPC .......................................................... 439/374

See application file for complete search history.

(56) References Cited

U.S. PATENT DOCUMENTS 3,054,080 A 9/1962 Ivar
4,808,127 A 2/1989 Swanic
7,179,113 B2 2/2007 Koenig et al.
8,974,244 B2 3/2015 Aihara (Continued)

OTHER PUBLICATIONS

"WoCo IEC 60320 Reference Information", Web Page, <https://shop.worldcordsets.com/shop/reference-materials/iec-60320-reference-chart>, 11 pages, Sep. 29, 2020, retrieved from Internet Archive Wayback Machine <https://web.archive.org/web/20200929161647/https:/shop.worldcordsets.com/shop/referenc e-materials/iec-60320-reference-chart>, on Jun. 23, 2022.

(Continued)

*Primary Examiner* — Gary F Paumen

(74) *Attorney, Agent, or Firm* — Troutman Pepper Hamilton Sanders LLP

(57) ABSTRACT

An electrical connector assembly includes a female connector, which includes a female connector housing defining a cavity having an hourglass shape and a first array of electrically-conductive pins disposed within the cavity. The electrical connector assembly further includes a male connector that includes a male connector housing having an hourglass-shaped protrusion dimensioned to be inserted into and fit tightly within the cavity and a second array of electrically-conductive sockets, which are contained within the protrusion and are dimensioned and aligned so that upon insertion of the protrusion into the cavity, each of the pins is introduced into and makes electrical contact with a respective one of the sockets.

20 Claims, 3 Drawing Sheets

(56) References Cited

U.S. PATENT DOCUMENTS

| | | | | |
|---|---|---|---|---|
| 11,557,848 | B2 * | 1/2023 | Barnea ................. | H01R 13/514 |
| 2012/0142210 | A1 | 6/2012 | Di Stefano | |
| 2012/0171891 | A1 | 7/2012 | Katou et al. | |
| 2015/0004830 | A1 | 1/2015 | Gomez et al. | |
| 2022/0181815 | A1 | 6/2022 | Barnea et al. | |

OTHER PUBLICATIONS

Extended European Search Report dated Apr. 26, 2022, for Application No. 21212141.2, 9 pages.

* cited by examiner

HIGH-DENSITY CONNECTOR

This application is a continuation of U.S. patent application Ser. No. 17/112,773, entitled "High-Density Connector," filed Dec. 4, 2020, the disclosure of which is incorporated by reference herein.

FIELD OF THE INVENTION

The present invention relates generally to medical devices, and particularly to electrical connectors for these devices.

BACKGROUND

Medical procedures, such as radio-frequency ablation, electroporation, and electrophysiological measurements within the heart and other internal organs, utilize a catheter inserted in a body of a subject. The catheter, comprising electrodes for both transmitting and receiving electrical signals between the body tissue and control electronics external to the body, is connected by an electrical connector to external electronics.

SUMMARY

Embodiments of the present invention that are described hereinbelow provide improved electrical connectors, particularly for medical devices.

There is therefore provided, in accordance with an embodiment of the present invention, an electrical connector assembly. The electrical connector assembly includes a female connector, which includes a female connector housing defining a cavity having an hourglass shape and a first array of electrically-conductive pins disposed within the cavity. The electrical connector assembly further includes a male connector, which includes a male connector housing having an hourglass-shaped protrusion dimensioned to be inserted into and fit tightly within the cavity and a second array of electrically-conductive sockets, which are contained within the protrusion and are dimensioned and aligned so that upon insertion of the protrusion into the cavity, each of the pins is introduced into and makes electrical contact with a respective one of the sockets.

In a disclosed embodiment, the hourglass shape includes peripheral areas on opposing sides of a central area, wherein the peripheral areas are not symmetrical about the central area.

In a further embodiment, the pins are recessed inside the cavity, whereby the pins contact the sockets only after the protrusion has been inserted into the cavity.

In another embodiment, the first array includes at least 100 pins.

In yet another embodiment, the protrusion includes centering holes having lead-in chamfers that are aligned with the sockets.

There is also provided, in accordance with an embodiment of the present invention, an electrical connector. The electrical connector includes a male connector housing having an hourglass-shaped protrusion dimensioned to be inserted into and fit tightly within an hourglass-shaped cavity of a female connector, which includes a first array of electrically-conductive pins disposed within the cavity. The electrical connector further includes a second array of electrically-conductive sockets, which are contained within the protrusion and are dimensioned and aligned so that upon insertion of the protrusion into the cavity, each of the pins is introduced into and makes electrical contact with a respective one of the sockets.

The present invention will be more fully understood from the following detailed description of the embodiments thereof, taken together with the drawings in which:

DETAILED DESCRIPTION OF EMBODIMENTS

Figure 1:
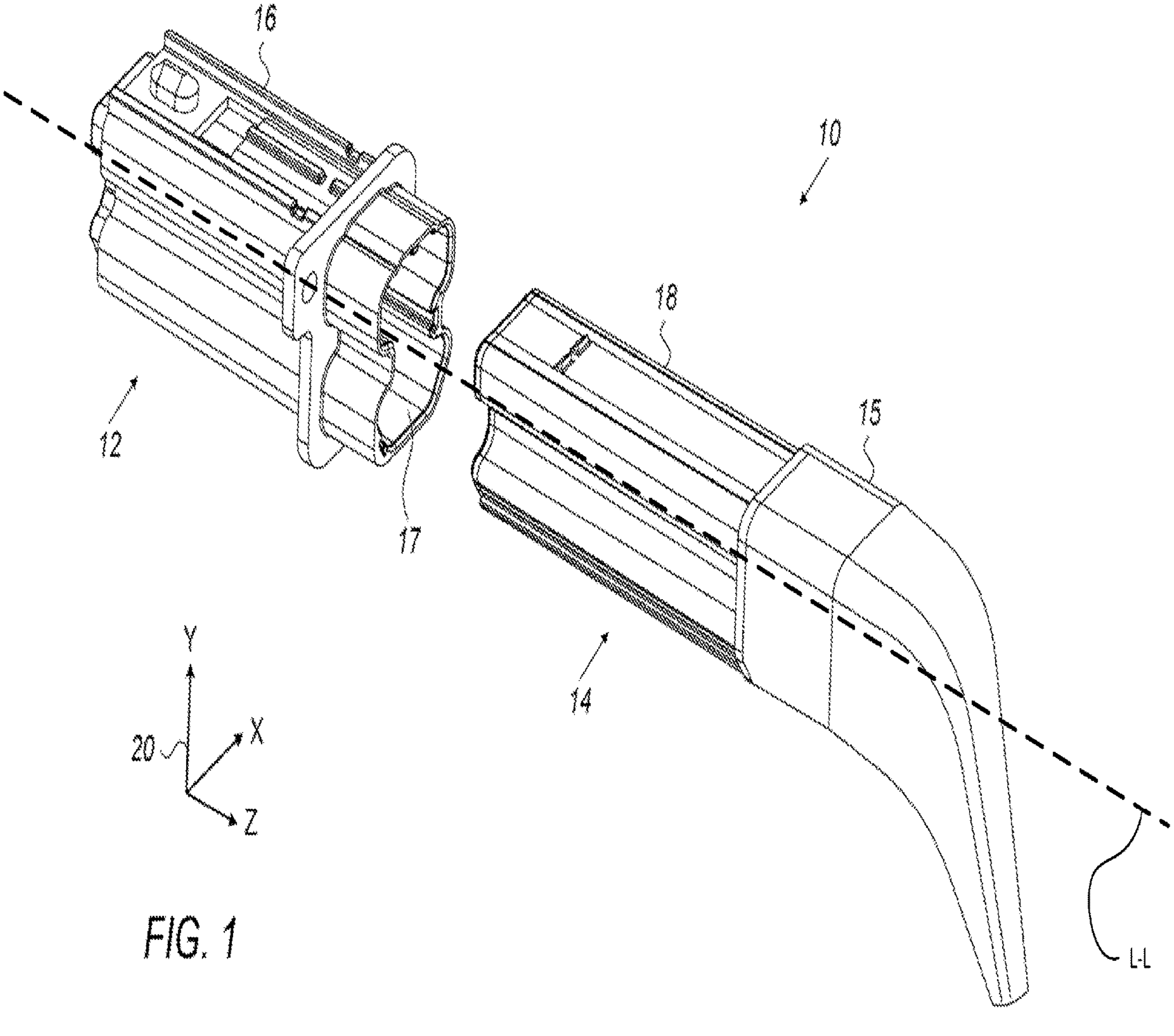
FIG. 1 is a schematic pictorial illustration of a connector assembly, in accordance with an embodiment of the invention.

As the number of electrodes on a catheter increases, the number of connecting conductors (wires or traces) correspondingly increases. These conductors are connected to external electronics so that data from the electrodes can be acquired and also so that signals can be transmitted to the electrodes. For large numbers of conductors, such as for catheters with 100 or more electrodes, there is a need for a connector with a high pin count that can be connected and disconnected repeatedly with precise alignment, is robust, and continues to operate without problems (such as by broken or damaged individual connecting pins) over multiple cycles of connection and disconnection.

The embodiments of the present invention that are described herein address this challenge by providing a connector assembly that combines high mechanical strength with precise alignment. The alignment is facilitated by deeply recessing the conductor pins in a cavity within the housing of the female connector, and constructing the male connector to have a long protrusion that conforms to the shape of the cavity. The male connector has pin-receiving sockets, which align with the pins when the protrusion is inserted into the cavity. The long protrusion and mating body cavity ensure that pins and sockets align exactly before they actually engage, thus virtually eliminating the possibility of bent pins. The recessing of both the pins and the sockets ensures that inadvertent contact with the pins or the pin-receiving sockets does not occur. This design is especially (though not exclusively) well suited for connectors with large numbers of pins, for example one hundred pins or more.

In the disclosed embodiments, the connector assembly comprises a female connector and a male connector. The housing of the female connector defines a cavity with an hourglass-shaped cross-section. The term "hourglass-shaped" is used in the context of the present description and in the claims in its conventional sense and refers to the cross-sectional shape of the cavity (as well as of a protrusion of the male connector). The cross-section comprises peripheral areas on opposing sides of a central area, with the peripheral areas wider than the central area. The female connector has an array of electrically-conducting pins within the cavity, where the pins are recessed within and protected from external forces by the sidewalls of the cavity. The male connector has a protrusion, which is similarly hourglass-shaped, and dimensioned for insertion into the cavity of the female connector with a tight fit. Within the protrusion, the male connector has an array of electrically-conducting sockets. The sockets are dimensioned and aligned so that upon insertion of the protrusion of the male connector into the cavity of the female connector, each of the pins is introduced into and makes electrical contact with a respective socket.

The tight fit of the protrusion of the male connector in the cavity of the female connector assures that the pins and the sockets are precisely aligned even before the pins enter the respective sockets. The hourglass-shape of the housing of the female connector provides high mechanical strength for its sidewalls for protection of the pins. The hourglass-shape, with a suitable asymmetry between the two peripheral areas of the hourglass, also provides a unique orientation for the insertion of the male connector into the female connector, thus avoiding bending or otherwise damaging the pins due to an improper alignment between the pins and the sockets.

FIG. 1 is a schematic pictorial illustration of a connector assembly 10, in accordance with an embodiment of the invention. Connector assembly 10 comprises a female connector 12 and a male connector 14. Female connector 12 comprises a housing 16 containing a cavity 17 with an hourglass-shaped cross-section (with the hourglass-shape further shown in FIG. 2). Male connector 14 comprises a housing 15 having a protrusion 18, whose cross-section is similarly shaped as an hourglass. Protrusion 18 is dimensioned so that it can be inserted, with a tight fit, into cavity 17 by sliding it in the negative z-direction of Cartesian coordinates 20 which can be referenced to central axis L-L. (For clarity, Cartesian coordinates 20 are also shown in FIGS. 2-3 in an appropriate orientation for each figure.)

The hourglass shape of cavity 17 provides a mechanically strong structure in order to protect electrically-conducting pins 30 (FIG. 3) located within the cavity. This kind of protection is especially important for connector assemblies with a large number of pins, such as connector assembly 10 with 122 pins (FIG. 2). The tight fit of protrusion 18 within cavity 17 assures a good alignment between pins 30 and electrically-conducting sockets 28 of protrusion 18 (FIG. 2), thus avoiding damage to the pins.

Figure 2:
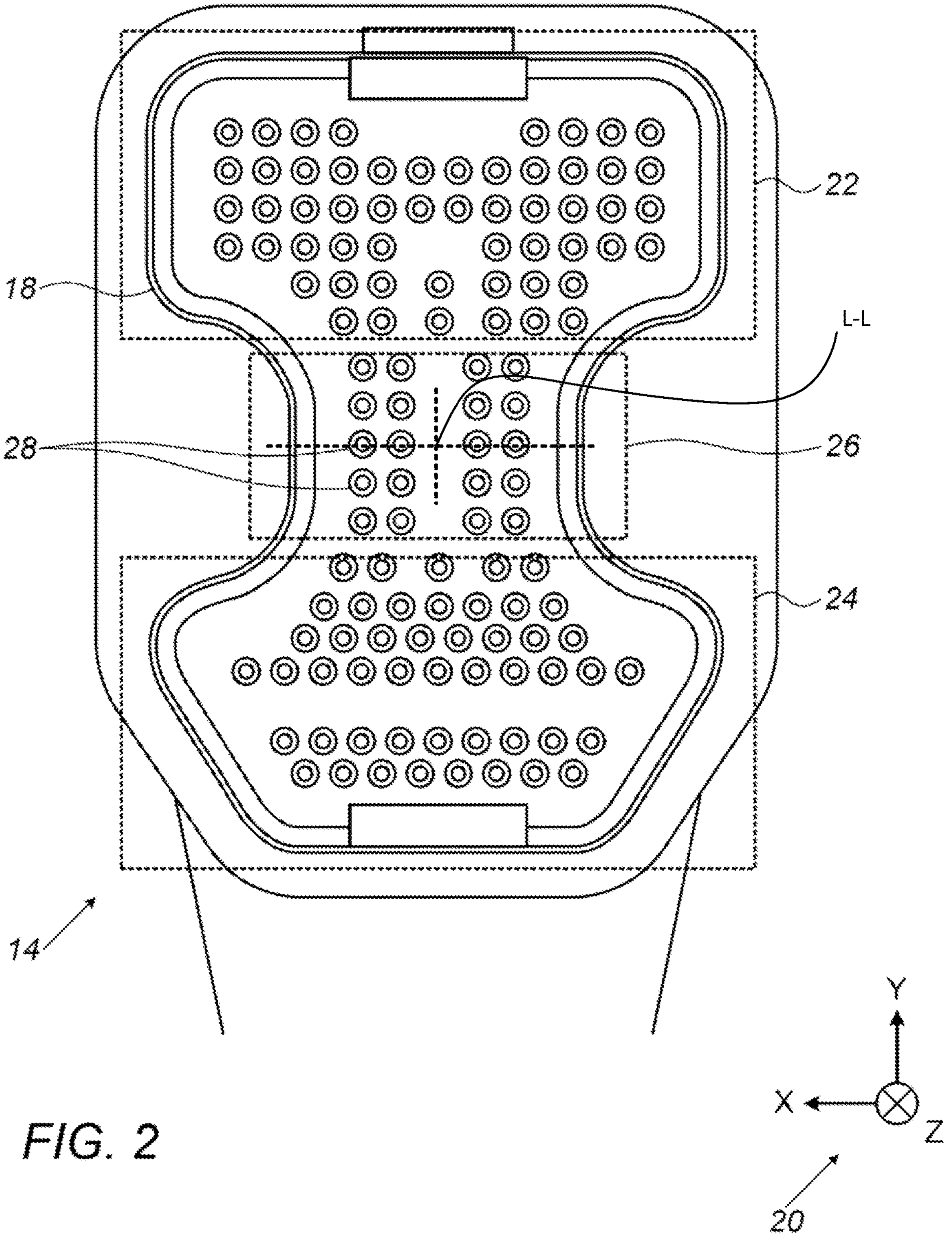
FIG. 2 is a schematic frontal view of a male connector in the connector assembly of FIG. 1, in accordance with an embodiment of the invention.
Figure 3:
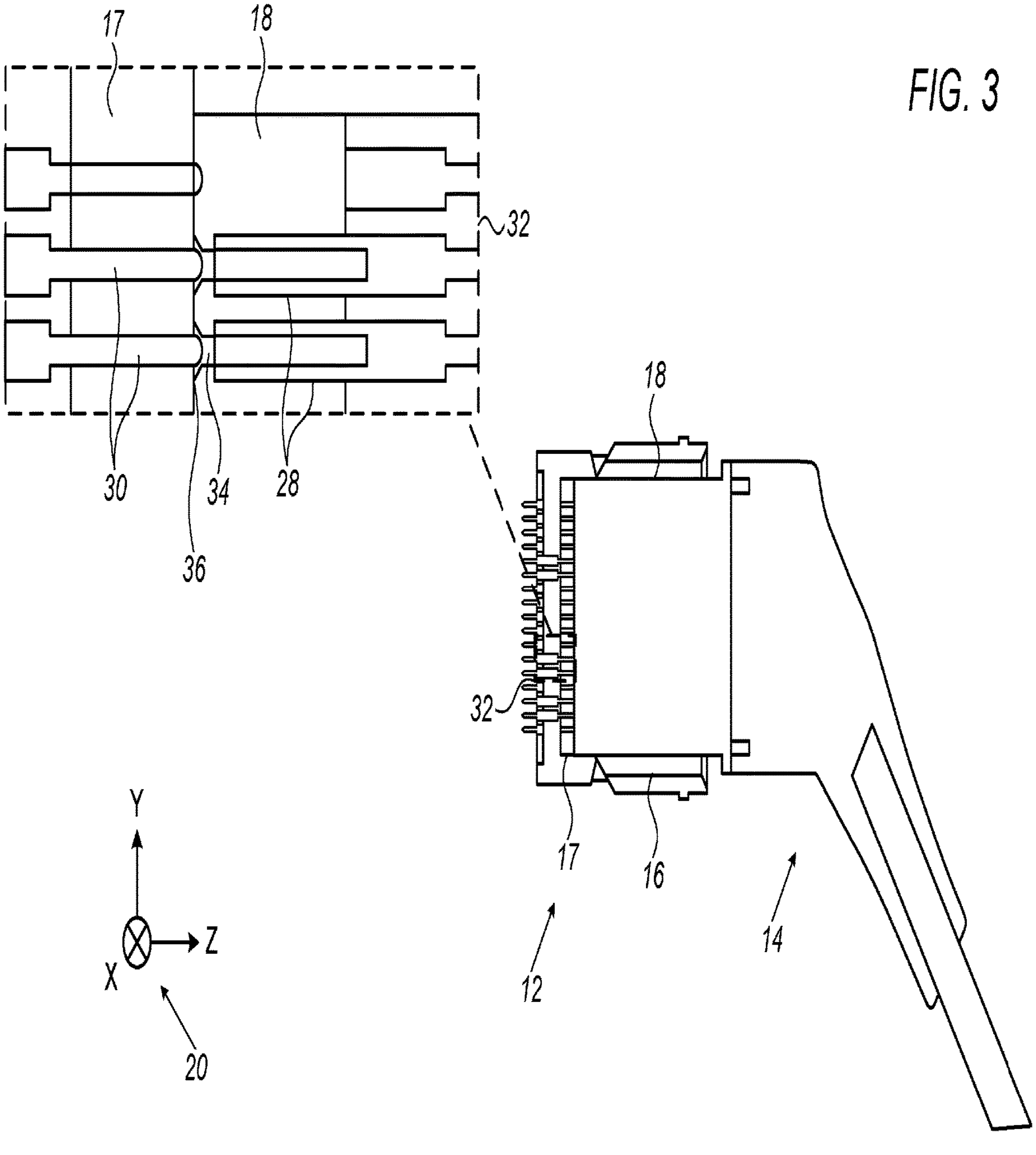
FIG. 3 is a partial sectional view of the connector assembly of FIG. 1, in accordance with an embodiment of the invention.

FIG. 2 is a schematic frontal view of male connector 14 of connector assembly 10, in accordance with an embodiment of the invention. In the frontal view (viewed along the z-direction), the hourglass-shape of the cross-section of protrusion 18 is clearly visible, with an upper peripheral area 22, a lower peripheral area 24, and a central area 26, disposed one above another in the Y-direction. The peripheral areas are wider than the central area in their X-dimensions, i.e., in the dimension transverse to the axis along which areas 22, 24 and 26 are disposed. Male connector 14 has an array of 122 electrically-conducting sockets 28 aligned along the Z-direction (coinciding with central axis L-L) within protrusion 18. Sockets 28 connect to 122 electrically-conducting pins 30 (FIG. 3) of female connector 12.

Upper and lower peripheral areas 22 and 24 are not symmetrical about central area, meaning in the pictured example that they do not have reflection symmetry with respect to the X-axis. In the present embodiment, upper peripheral area 22 has a rectangular shape, whereas lower peripheral area 24 has a trapezoidal shape, although other, mutually non-symmetrical shapes may be used. This asymmetry between the two peripheral areas prevents inserting male connector 14 into female connector 12 in the wrong orientation, and thus prevents misalignment between sockets 28 and pins 30, as such misalignment might cause bending or other damage to the pins.

FIG. 3 is a partial sectional view of connector assembly 10, in accordance with an embodiment of the invention. In FIG. 3, protrusion 18 of male connector 14 has been partially inserted into cavity 17 of female connector 12 to a depth, whereby the outer ends of pins 30 have entered sockets 28. An inset 32 shows the meeting of pins 30 and sockets 28 in greater detail. Pins 30 are recessed inside cavity 17, i.e., the outer ends of the pins are contained inside the cavity, behind the outer plane of housing 16. Thus, pins 30 contact the respective sockets 28 only after the protrusion has been inserted into the cavity. In front of each socket 28, protrusion 18 has a centering hole 34 with a lead-in chamfer 36, aligned with the socket, in order to guide the appropriate pin 30 securely into the socket. In order to effect electrical contacts through connector assembly 10, male connector 14 has to be pushed further into female connector 12, until pins 30 are securely seated inside sockets 28.

Electrical conductors (not shown in the figures) are attached to sockets 28 and pins 30 (for each connector on the side opposite to the other connector) and carry electrical signals to and from connector assembly 10. Both sockets 28 and pins 30 have suitable extensions for attaching these conductors by soldering, pressing, or by other methods known to those skilled in the assembly of electronic components.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An apparatus, comprising:

(a) a male connector, comprising:
- (i) an hourglass-shaped protrusion including:
  - (A) a first portion,
  - (B) a second portion, and
  - (C) a third portion positioned between the first and second portions, the third portion being narrower than each of the first and second portions, and
- (ii) a plurality of electrically-conductive sockets positioned on the hourglass-shaped protrusion, at least one socket of the plurality of electrically-conductive sockets being positioned solely on the third portion; and (b) a female connector, comprising:
- (i) an hourglass-shaped cavity, the hourglass-shaped cavity being sized and configured to securely receive the hourglass-shaped protrusion, and
- (ii) a plurality of electrically-conductive pins positioned within the hourglass-shaped cavity, each pin of the plurality of electrically-conductive pins being configured to electrically engage a respective socket of the plurality of electrically-conductive sockets when the hourglass-shaped protrusion is received within the hourglass-shaped cavity.

2. The apparatus of claim 1, the first and second portions being asymmetrical relative to the third portion.

3. The apparatus of claim 1, the plurality of electrically-conductive pins being recessed inside the hourglass-shaped cavity.

4. The apparatus of claim 1, the plurality of electrically-conductive pins comprising at least 100 pins.

5. The apparatus of claim 1, the hourglass-shaped protrusion comprising a plurality of centering holes, each centering hole of the plurality of centering holes being aligned with a respective socket of the plurality of electrically-conductive sockets.

6. The apparatus of claim 5, each centering hole of the plurality of centering holes having a respective lead-in chamfer.

7. The apparatus of claim 1, at least one socket of the plurality of electrically-conductive sockets being positioned on the first portion, at least one socket of the plurality of electrically-conductive sockets being positioned on the second portion.

8. The apparatus of claim 1, the first portion being rectangular.

9. The apparatus of claim 8, the second portion being trapezoidal.

10. The apparatus of claim 1, the hourglass-shaped cavity and hourglass-shaped protrusion being configured to align each pin of the plurality of electrically-conductive pins with a respective one of the plurality of electrically-conductive sockets at the beginning of insertion of the hourglass-shaped protrusion into the hourglass-shaped cavity but before electrical contact is made between the pin and socket.

11. The apparatus of claim 1, the hourglass-shaped protrusion being configured to fit only one way into the hourglass-shaped cavity.

12. The apparatus of claim 1, further comprising a conductor in electrical contact with each pin of the plurality of electrically-conductive pins.

13. The apparatus of claim 1, further comprising a conductor in electrical contact with each socket of the plurality of electrically-conductive sockets.

14. The apparatus of claim 1, the male and female connectors being configured to be connected and disconnected repeatedly without damage to the apparatus.

15. An apparatus, comprising:

(a) an hourglass-shaped protrusion, the hourglass-shaped protrusion being sized and configured to be securely received within an hourglass-shaped cavity of a female connector, the hourglass-shaped protrusion including:

(i) a first portion, (ii) a second portion, and (iii) a third portion positioned between the first and second portions, the third portion being narrower than each of the first and second portions; and (b) a plurality of electrically-conductive sockets positioned on the hourglass-shaped protrusion, at least one socket of the plurality of electrically-conductive sockets being positioned solely on the third portion, each socket of the plurality of electrically-conductive sockets being configured to electrically engage a respective electrically-conductive pin positioned within the hourglass-shaped cavity of the female connector when the hourglass-shaped protrusion is received within the hourglass-shaped cavity.

16. The apparatus of claim 15, the first and second portions being asymmetrical relative to the third portion.

17. The apparatus of claim 15, the plurality of electrically-conductive sockets comprising at least 100 sockets.

18. The apparatus of claim 15, the hourglass-shaped protrusion comprising a plurality of centering holes, each centering hole of the plurality of centering holes being aligned with a respective socket of the plurality of electrically-conductive sockets.

19. The apparatus of claim 18, each centering hole of the plurality of centering holes having a respective lead-in chamfer.

20. An apparatus, comprising:

(a) an hourglass-shaped cavity, the cavity being sized and configured to securely receive an hourglass-shaped protrusion of a male connector, the cavity including:

(i) a first portion, (ii) a second portion, and (iii) a third portion positioned between the first and second portions, the third portion being narrower than each of the first and second portions; and (b) a plurality of electrically-conductive pins positioned within the hourglass-shaped cavity, at least one pin of the plurality of electrically-conductive pins being positioned solely within the third portion, each pin of the plurality of electrically-conductive pins being configured to electrically engage a respective electrically-conductive socket positioned on the hourglass-shaped protrusion of the male connector when the hourglass-shaped protrusion is received within the hourglass-shaped cavity.

* * * * *